US011283604B2

(12) United States Patent
Soran et al.

(10) Patent No.: US 11,283,604 B2
(45) Date of Patent: Mar. 22, 2022

(54) SHARING ENCRYPTED DATA WITH ENHANCED SECURITY BY REMOVING UNENCRYPTED METADATA

(71) Applicant: Microsoft Technology Licensing, LLC, Redmond, WA (US)

(72) Inventors: Muhammed Serdar Soran, Seattle, WA (US); David C LeBlanc, Monroe, WA (US); Adam D. Barr, Redmond, WA (US); Tolga Acar, Sammamish, WA (US); Ray S. Wang, Bellevue, WA (US); Samantha Schumacher, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 645 days.

(21) Appl. No.: 14/726,228

(22) Filed: May 29, 2015

(65) Prior Publication Data

US 2016/0352517 A1 Dec. 1, 2016

(51) Int. Cl.
*H04L 9/08* (2006.01)
*G06F 21/62* (2013.01)
*H04L 29/06* (2006.01)
*G06F 21/46* (2013.01)
*G06F 21/30* (2013.01)

(52) U.S. Cl.
CPC .......... *H04L 9/0863* (2013.01); *G06F 21/305* (2013.01); *G06F 21/46* (2013.01); *G06F 21/6209* (2013.01); *H04L 63/0435* (2013.01); *H04L 63/061* (2013.01); *H04L 63/062* (2013.01); *G06F 2221/2107* (2013.01); *H04L 2463/061* (2013.01)

(58) Field of Classification Search
CPC ... H04L 9/0863; H04L 63/062; H04L 63/083; H04L 9/3226; H04L 63/0435; H04L 63/061; H04L 2463/061; G06F 21/305; G06F 21/46; G06F 21/6209; G06F 2221/2107
See application file for complete search history.

(56) References Cited

U.S. PATENT DOCUMENTS 6,947,556 B1    9/2005 Matyas, Jr. et al.
7,320,008 B1 *  1/2008 Colgrove ............ G06F 21/6227
(Continued)

OTHER PUBLICATIONS

RFC 2898 Password-Based Cryptography Sep. 2000, pp. 1-32.*
(Continued)

*Primary Examiner* — Luu T Pham
*Assistant Examiner* — James J Wilcox
(74) *Attorney, Agent, or Firm* — Jacob P. Rohwer; Newport IP, LLC (57) ABSTRACT

Concepts and technologies are described herein for sharing encrypted data with enhanced security. In some configurations, an encryption key is generated from a password by the use of a password-based key generation technology. In addition, input data is encrypted using the encryption key. The encrypted data and the generated key may be then shared with a remote computer, such as a server. The encrypted data can then be decrypted at the remote computer by the use of the key. By the use of the technologies described herein, the contents of an encrypted file may be accessed at a remote computer without requiring a user to share the actual password.

19 Claims, 6 Drawing Sheets

(56) References Cited

U.S. PATENT DOCUMENTS

| | | | | |
|---|---|---|---|---|
| 7,373,517 | B1* | 5/2008 | Riggins | H04L 9/0863 380/44 |
| 7,483,895 | B2* | 1/2009 | Hysom | G06F 17/30011 |
| 7,688,975 | B2 | 3/2010 | Lin et al. | |
| 8,429,424 | B2* | 4/2013 | Witt | G06F 21/6218 713/193 |
| 8,601,603 | B1* | 12/2013 | Fleizach | H04L 63/0428 380/250 |
| 8,751,804 | B1 | 6/2014 | Nystrom et al. | |
| 8,850,206 | B2 | 9/2014 | Farrugia et al. | |
| 8,977,697 | B2* | 3/2015 | Massand | G06Q 10/107 709/204 |
| 9,262,643 | B2* | 2/2016 | Cidon | G06F 21/6218 |
| 9,268,964 | B1* | 2/2016 | Schepis | G06F 21/6227 |
| 9,413,754 | B2* | 8/2016 | Stuntebeck | G06F 21/30 |
| 9,521,123 | B2* | 12/2016 | Jueneman | H04L 9/0822 |
| 9,537,918 | B2* | 1/2017 | Chan | G06F 16/93 |
| 9,813,389 | B2* | 11/2017 | Sauerwald | G06F 11/1458 |
| 10,095,874 | B1* | 10/2018 | Ghetti | G06F 21/602 |
| 2005/0022020 | A1 | 1/2005 | Fremberg | |
| 2005/0229257 | A1* | 10/2005 | Kim | G06F 21/10 726/27 |
| 2006/0075041 | A1* | 4/2006 | Antonoff | H04L 67/28 709/206 |
| 2007/0005974 | A1* | 1/2007 | Kudou | G06F 21/606 713/171 |
| 2007/0297610 | A1* | 12/2007 | Chen | H04L 9/0822 380/270 |
| 2008/0031446 | A1* | 2/2008 | Suga | G11B 20/00086 380/44 |
| 2008/0066152 | A1* | 3/2008 | Wong | H04L 63/0428 726/2 |
| 2008/0301470 | A1 | 12/2008 | Green et al. | |
| 2009/0132803 | A1* | 5/2009 | Leonard | H04L 9/00 713/150 |
| 2009/0285396 | A1* | 11/2009 | Wong | G06F 17/303 380/277 |
| 2010/0191975 | A1* | 7/2010 | Chase | G06F 21/6254 713/176 |
| 2010/0325732 | A1 | 12/2010 | Mittal et al. | |
| 2012/0066498 | A1* | 3/2012 | Engert | G06F 21/51 713/170 |
| 2013/0111217 | A1 | 5/2013 | Kopasz et al. | |
| 2013/0145447 | A1* | 6/2013 | Maron | G06F 21/31 726/6 |
| 2013/0152160 | A1* | 6/2013 | Smith | G06F 21/604 726/1 |
| 2013/0191922 | A1* | 7/2013 | Rigas | G06F 21/60 726/26 |
| 2013/0212392 | A1* | 8/2013 | Nagarajan | H04L 9/0825 713/171 |
| 2014/0095881 | A1 | 4/2014 | Chan et al. | |
| 2014/0101451 | A1 | 4/2014 | Chan et al. | |
| 2014/0281574 | A1* | 9/2014 | Webb | G06F 21/74 713/189 |
| 2015/0271146 | A1* | 9/2015 | Holyfield | H04L 63/0428 713/171 |

OTHER PUBLICATIONS

Tsai et al. "A Group File Encryption Method using Dynamic System Environment Key," 2014 International Conference on Network-Based Information Systems, 2014, IEEE, pp. 476-483 (Year: 2014).*

Dong, et al., "Shared and Searchable Encrypted Data for Untrusted Servers", In Proceedings of the 22nd annual IFIP WG 11.3 working conference on Data and Applications Security, Jul. 13, 2008, 30 pages.

Microsoft.com, "What's this Microsoft Oneline Service?", retreived on May 6, 2015, available at: https://support.office.com/en-US/client/What-s-this-Microsoft-online-service-ef8ff042-c40c-4d9f-9d11-Od21f88e4179, 1 page.

Oracle.com, "Using Client-Side Password Encryption", Retrieved on: Apr. 30, 2015, available at: http://docs.oracle.com/cd/E41069_01/Platform.11-0/ATGPersProgGuide/html/s3801usingclientsidepasswordencryptio01.html, 2 pages.

Tesorit.com, "Details on Cryptographic Protection," published on Apr. 14, 2015, available at https://tresorit.com/security/end-to-end-encryption, 12 pages.

* cited by examiner

SHARING ENCRYPTED DATA WITH ENHANCED SECURITY BY REMOVING UNENCRYPTED METADATA

BACKGROUND

Encryption technologies provide a number of benefits to many aspects of the computing industry. For instance, encrypted files may be shared between computers while providing controlled access to the contents of the files. In one illustrative example, a user of a client computer may encrypt a document using a password. The user may share the encrypted document with a remote computer, such as a server, with some certainty that the contents of the document will not be accessed without the password.

Although encryption technologies provide a high level of security, most existing technologies require a user to share a password with other users or computers to actually communicate the contents of encrypted data. In the present example, in addition to communicating the encrypted document to the remote computer, the user of the client computer also needs to share the password. Such a scenario may not be desirable for number of reasons. For example, it is common for users to have one password for many systems and documents. Thus, given that practice, if a user shares a document and a corresponding password, the security of other items that use the shared password may be at risk.

It is with respect to these and other considerations that the disclosure made herein is presented.

SUMMARY

Concepts and technologies are described herein for sharing encrypted data with enhanced security. In some configurations, an encryption key is generated from a password by the use of a password-based key generation technology. In addition, input data is then encrypted using the encryption key. The encrypted data and the generated key may be then shared with a remote computer, such as a server. The encrypted data can then be decrypted at the remote computer by the use of the key. By the use of the technologies described herein, the contents of an encrypted file may be accessed at a remote computer without requiring a user to share the password.

Technologies described herein also include the removal of selected metadata to improve the security of the shared content. When a file is encrypted using a password, some encryption technologies also embed metadata within the file. In some instances, the metadata may include information describing the encryption algorithm and other data used to generate the encrypted data. Techniques described herein remove selected portions of the metadata from an encrypted file, thus limiting the distribution of data that may be used to generate the password.

In one illustrative example, configurations disclosed herein may involve the verification of a password before any input data, which may include plain-text data, is encrypted. In such implementations, a verifier may be generated from a password and other input data such as verifier salt. In some configurations, when the input data is encrypted, the verifier may be integrated with the encrypted data. In such configurations, the verifier is not encrypted. It can be appreciated that some existing technologies for encrypting data may also integrate the verifier salt with the encrypted data. If such technologies are used, configurations herein may remove the verifier salt. Thus, as will be described below, when the encrypted data is communicated to another computer or user, the encrypted data and the verifier are delivered without the salt verifier. For illustrative purposes, the salt verifier is also referred to herein as "salt data."

Technologies described herein also include techniques for removing select metadata from the generated key. In addition to generating a key, some password-based key derivation (PBKD) algorithms may produce PBKD-specific metadata such as information describing the encryption algorithm. Technologies described herein include techniques for removing select portions of the PBKD-specific metadata.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to systems, methods, computer-readable instructions, modules, algorithms, hardware logic and/or operations as permitted by the context described above and throughout the document. Items or conditions that Furthermore, the claimed subject matter is not limited to implementations that solve any or all disadvantages noted in any part of this disclosure.

DETAILED DESCRIPTION

The following detailed description is directed to concepts and technologies for sharing encrypted data with enhanced security. In some configurations, an encryption key is generated from a password by the use of a password-based key generation technology. Any number of known techniques configured to receive a password to generate an encryption key may be used. In addition, input data, such as a file, is encrypted using the encryption key. The input data can be encrypted at a computer, such as a client computing device. The encrypted data and the generated key may be shared with a remote computer, such as a server. The encrypted data can then be decrypted at the remote computer by the use of the key. By the use of the technologies described herein, the contents of an encrypted file may be accessed at a remote computer without requiring a user to share the actual password.

Technologies described herein also include the removal of selected metadata to improve the security of the shared content. When a file is encrypted using a password, some encryption technologies also embed unencrypted metadata within the encrypted file. In some instances, the metadata may include information describing the encryption algorithm and other data used to generate the encrypted data. Techniques described herein remove selected portions of the metadata from an encrypted file, thus limiting the distribution of data that may be used to generate the password.

Technologies described herein also include techniques for removing select metadata from the generated key. In addition to generating a key, a PBKD algorithm may produce PBKD-specific metadata such as information describing the encryption algorithm. Technologies described herein include techniques for removing select portions of the PBKD-specific metadata.

By use of the techniques described herein, security of a system or data that is protected by the use of a password may be improved. In one aspect, security of the system or data may be improved by providing a mechanism that allows a user to share encrypted data without sharing a password. In other aspects, the techniques described herein improve a user's interaction with a computer. For instance, if the distribution of a password is not necessary, the password may be used for other files or systems, reducing the need for a computer or a user to manage multiple passwords for different files, systems, or groups of data.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system and methodology for sharing encrypted data with enhanced security will be described.

Figure 1:
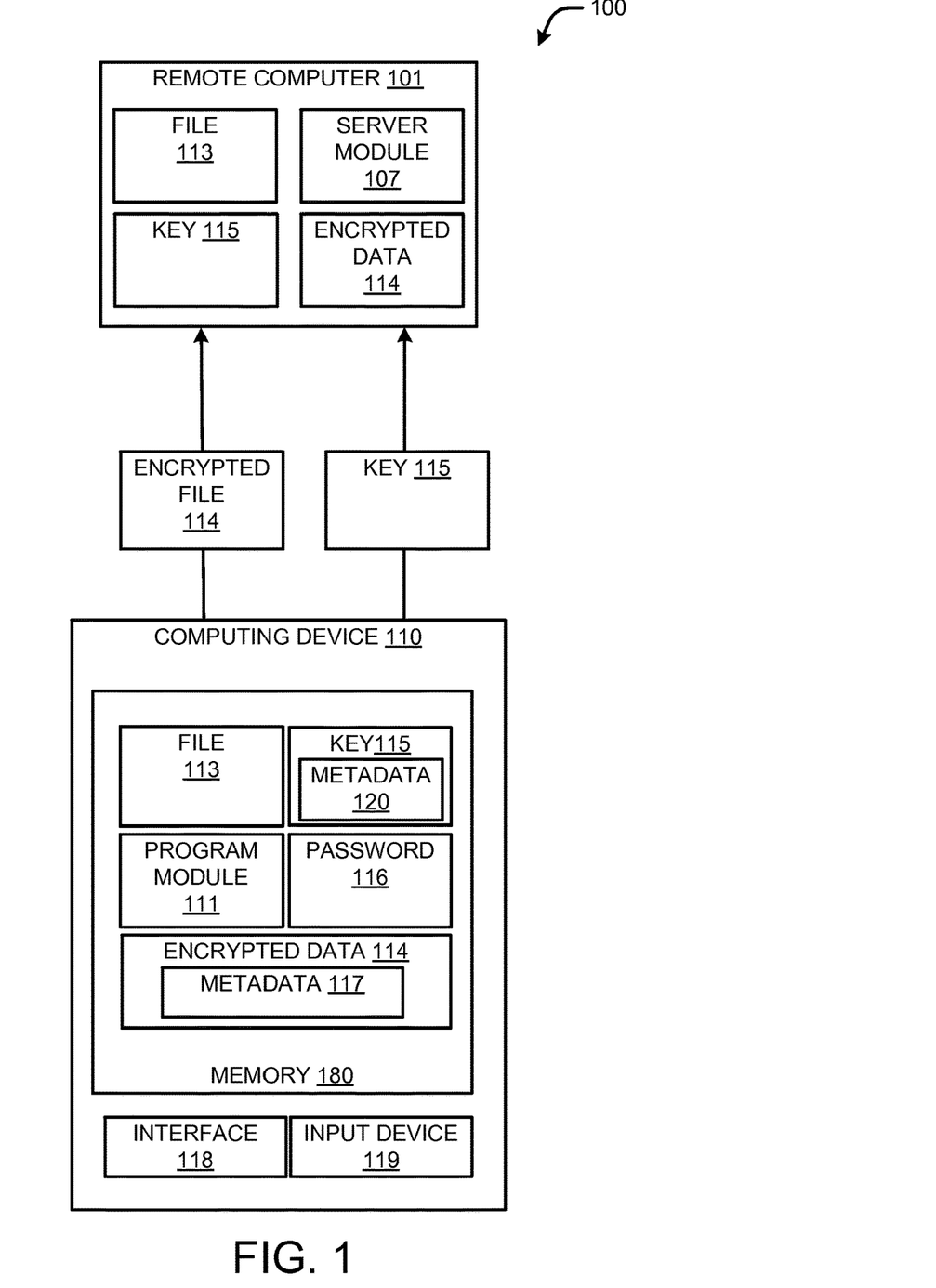
FIG. 1 is a block diagram showing several example components for sharing encrypted data with enhanced security.

FIG. 1 is a system diagram showing aspects of one illustrative mechanism disclosed herein for sharing encrypted data with enhanced security. As shown in FIG. 1, a system 100 may include a remote computer 101 and a computing device 110. The computing device 110 may operate as a stand-alone device, or the computing device 110 may operate in conjunction with the remote computer 101. As can be appreciated, the remote computer 101 and the computing device 110 are interconnected through one or more local and/or wide area networks (not shown). It should be appreciated that this example is provided for illustrative purposes only and is not to be construed as limiting. The techniques described herein may utilize more or fewer computers than those shown in FIG. 1.

The computing device 110 may be in the form of a personal computer, a wearable computer, a mobile phone, or any other device having components for processing and communicating data. For example, the computing device 110 may be a tablet having one or more modules configured with the techniques described herein. The tablet may be configured to store, process and communicate one or more files, which may include a document that can be modified by one or more applications such as a word processing application.

The computing device 110 may include a local memory 180 that is capable of storing a file data 113, a key 115, a password 116 and an encrypted file 114. As will be described in more detail herein, the encrypted file 114 may also include metadata 117. The local memory 180 may also include a program module 111 configured to manage techniques described herein and interactions between a user and the computing device 110. The program module 111 may be a game application, a virtual reality application, a productivity application, or an operating system component or any other application configured to process encrypted data.

The remote computer 101 may be in the form of a personal computer, server computer or a number of server computers configured to store and process encrypted data. As can be appreciated, the remote computer 101 may be configured to communicate, process and store the key 115 and the encrypted file 114. The remote computer 101 may also include components such as the server module 107, for executing one or more techniques described herein. For instance, the server module 107 may be configured to process the key 115 and the encrypted file 114 to generate unencrypted data, which may be in the form of the file 113. As will be described in more detail herein, the server module 107 may operate in conjunction with, or independent of, other modules, such as the program module 111, to implement aspects of the techniques disclosed herein.

In one illustrative example, during operation, the computing device 110 may display data on an interface 118. The displayed data may allow a user to interact with the computing device 110. In addition, by the use of at least one input device 119, such as a camera, microphone, keyboard or any other device, a user may provide input data, such as a password. Although this illustrative example shows that a password is received from a user, it can be appreciated that a password may be obtained from any resource. For example, the password may be provided by a user or one or more modules of any computing device. These examples are provided for illustrative purposes only and are not to be construed as limiting.

During operation, the system 100 obtains input data, which for illustrative purposes is referred to herein as a file 113. Although the input data is referred to herein as a file 113, the input data may contain any type of data in any format. In one illustrative example, the file 113 may be a document.

Using one or more modules or components, such as the program module 111, the computing device 110 obtains a password 116. The password 116 may be obtained from any resource, including a user input or a computer configured to generate passwords. The password 116 may also be in any format. The computing device 110 also obtains input data, which for illustrative purposes is referred to herein as a file 113.

Using a password-based key generation technology, the computing device 110 generates a key 115 from the password 116. For illustrative purposes, the encryption key 115 is also referred to herein as a "key 115." Any known method suitable technologies for generating a key from a password, such as a PBKD algorithm, may be used by the techniques described herein.

Next, the computing device 110 generates encrypted data 114 from the input data, e.g., the file 113, and the generated key 115. Any suitable encryption technology for generating encrypted data 114 from a key 115 and input data, e.g., the file 113, may be used with techniques described herein. For example, any technology that is based on the Advanced Encryption Standard (AES) may be used with the techniques described herein.

It can be appreciated that the use of one or more encryption technologies may generate metadata 117 that is embedded in the encrypted data 114. The metadata 117 may include information describing the encryption technique and other "filler" data that may be a part of the encryption process. In some configurations, the computing device 110 can remove one or more parts of the metadata 117. For instance, the computing device 110 can be configured to remove the filler data, information describing the encryption technique, and/or any other type of data that may result from encryption process.

To share the contents of the file 113 with other computers or users, the computing device 110 can communicate the encrypted data 114 and the key 115 to any computer, such as the remote computer 101. At the remote computer 101, any application or module, such as the server module 107 may generate the file 113 by decrypting the encrypted data 114 using the key 115. Any known technique for decrypting data by the use of a key 115, including AES technologies, may be used. By the use of the technologies described herein, the contents of an encrypted file may be accessed at a remote computer without requiring a user to share the password.

Figure 2:
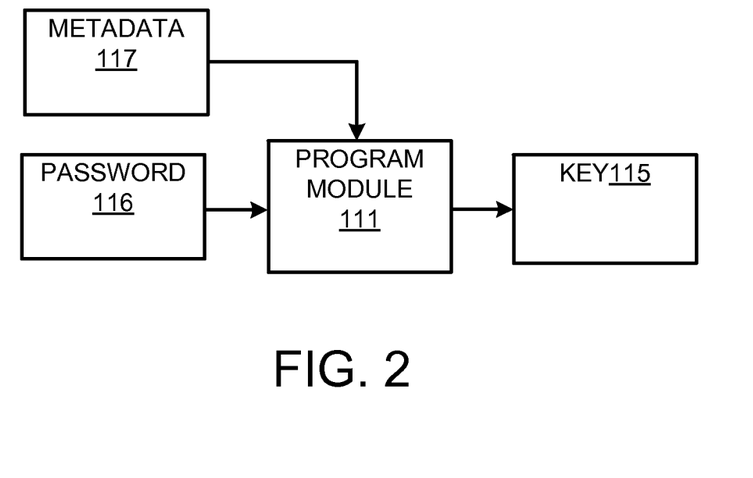
FIG. 2 illustrates a block diagram showing the generation of an encryption key from a password and metadata.
Figure 3:
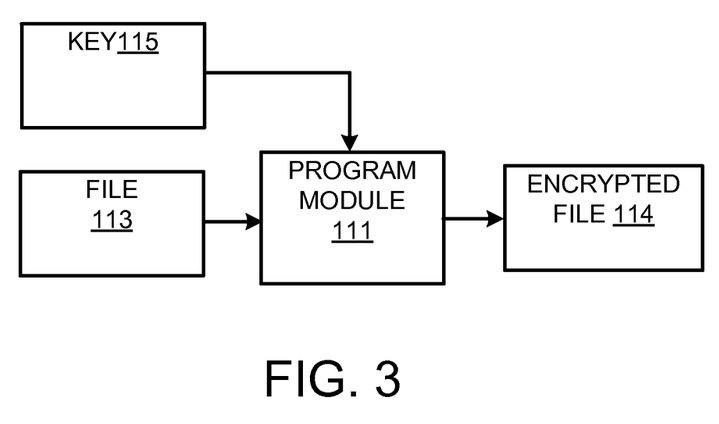
FIG. 3 illustrates a block diagram showing the generation of encrypted data from a file and an encryption key.
Figure 4:
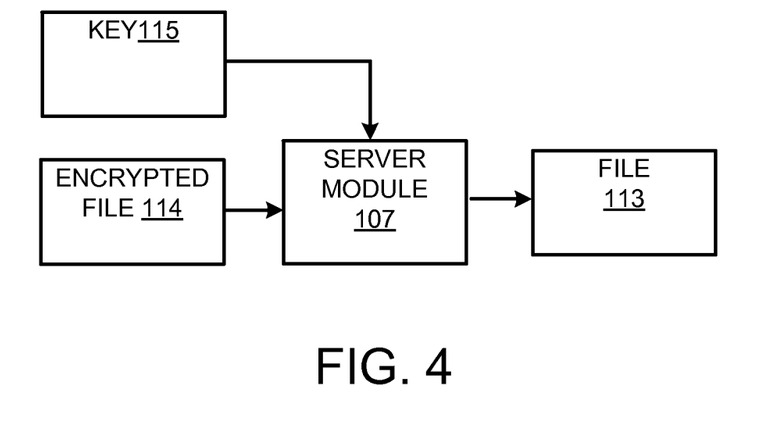
FIG. 4 illustrates a block diagram showing the generation of a file containing unencrypted data from the key and the encrypted data.

FIGS. 2, 3 and 4 illustrate several example block diagrams depicting how techniques disclosed herein process various types of data, including the file 113, encryption key 115, password 116 and the encrypted file 114. Specifically, FIG. 2 illustrates a block diagram showing the generation of an encryption key 115 from a password 116 and metadata 117. FIG. 3 illustrates a block diagram showing the generation of an encrypted file 114 from the file 113 and the key 115. FIG. 4 illustrates a block diagram showing the generation of a file containing unencrypted data from the key 115 and the encrypted file 114.

Figure 5:
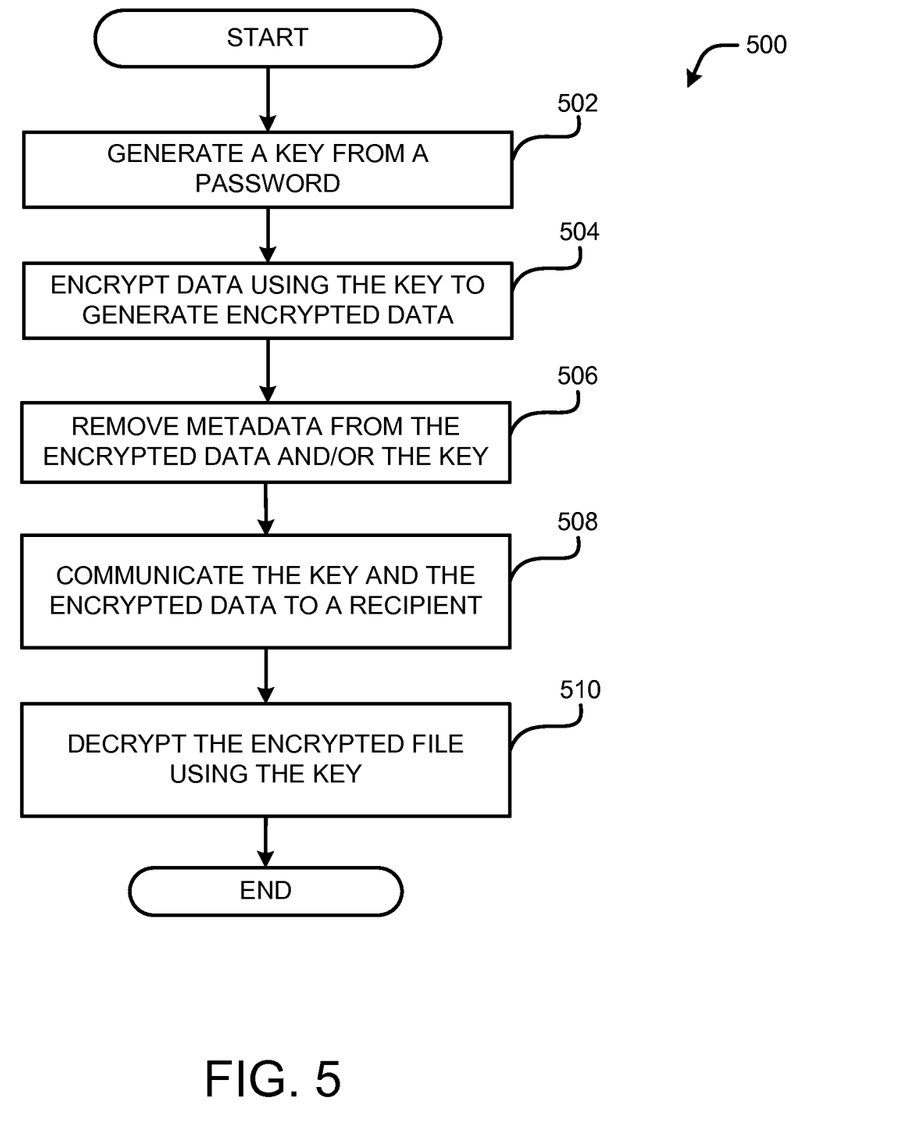
FIG. 5 is a flow diagram of one example routine that may be used for sharing encrypted data with enhanced security.

Turning now to FIG. 5, aspects of a routine 500 for sharing encrypted data with enhanced security are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in more detail below, in conjunction with FIG. 1, the operations of the routine 500 are described herein as being implemented, at least in part, by an application, component and/or circuit, such as the program module 111 and/or the server module 107. Although the following illustration refers to the components of FIG. 1, it can be appreciated that the operations of the routine 500 may be also implemented in many other ways. For example, the routine 500 may be implemented, at least in part, by computer processor or processor of another computer. In addition, one or more of the operations of the routine 500 may alternatively or additionally be implemented, at least in part, by a chipset working alone or in conjunction with other software modules. Any service, circuit or application suitable for providing contextual data indicating the position or state of any device may be used in operations described herein.

With reference to FIG. 5, the routine 500 begins at operation 502, where the program module 111 generates an encryption key 115 from the password 116. One or more password-based key generation techniques, the computing device 110 can be configured to generate an encryption key 115 from the password 116. Any known method suitable for generating a key from a password, e.g., a password-based key derivation (PBKD) algorithm, may be used by the techniques described herein. Other forms of input may be used in operation 502 to generate they key 115. For instance, data such as salt, iteration count, hash algorithm to be used, encryption algorithm for which the key will be generated may be used to generate the key 115. Salt data may include other data, which may be a product of the key generation process.

Next, at operation 504, the program module 111 uses one or more encryption techniques to generate encrypted data 114 from the input data, e.g., the file 113, and the key 115. Any suitable encryption technology conformed to create encrypted data 114 from a key 115 and a file 113 may be used with techniques described herein. For example, any technology based on AES technologies may be used with the techniques described herein.

Next, at operation 506, the program module 111 can remove metadata 117 from the encrypted data 114. As summarized above, it can be appreciated that the use of one or more encryption technologies may generate metadata 117 that is embedded in the encrypted data 114. The metadata 117 may include information describing the relevant encryption technique and other data that may be a part of the encryption process. In some configurations, the computing device 110 can remove one or more parts of the metadata 117. For instance, the computing device 110 can be configured to remove filler data, information describing the encryption technique, and/or any other type of data that may result from encryption process.

In addition to removing the metadata 117 from the encrypted data 114, technologies described herein also include techniques for removing select PBKD-specific metadata 120 from the generated key 115. For example, PBKD-specific metadata 120 may include information describing the relevant encryption algorithm. In some configurations, such data is removed before the key 115 is communicated to a remote computer.

Next, at operation 508, the key 115 and the encrypted data 114 are communicated to a recipient. As can be appreciated, operation 508 may include the communication of the key 115 and the encrypted data 114 to any account, platform, computer, or any other medium for storing the data. In one illustrative example, as shown in FIG. 1, the key 115 and the encrypted data 114 are communicated from the computing 110 to the remote computer 101.

Next, at operation 510, one or more modules, such as the server module 107, utilizes the key 115 to decrypt the encrypted data 114. Any suitable technology configured to decrypt the encrypted data 114 using the key 115 may be used with the techniques described herein. The output of operation 510 may be identical to the input data, e.g., the file 113.

Figure 6:
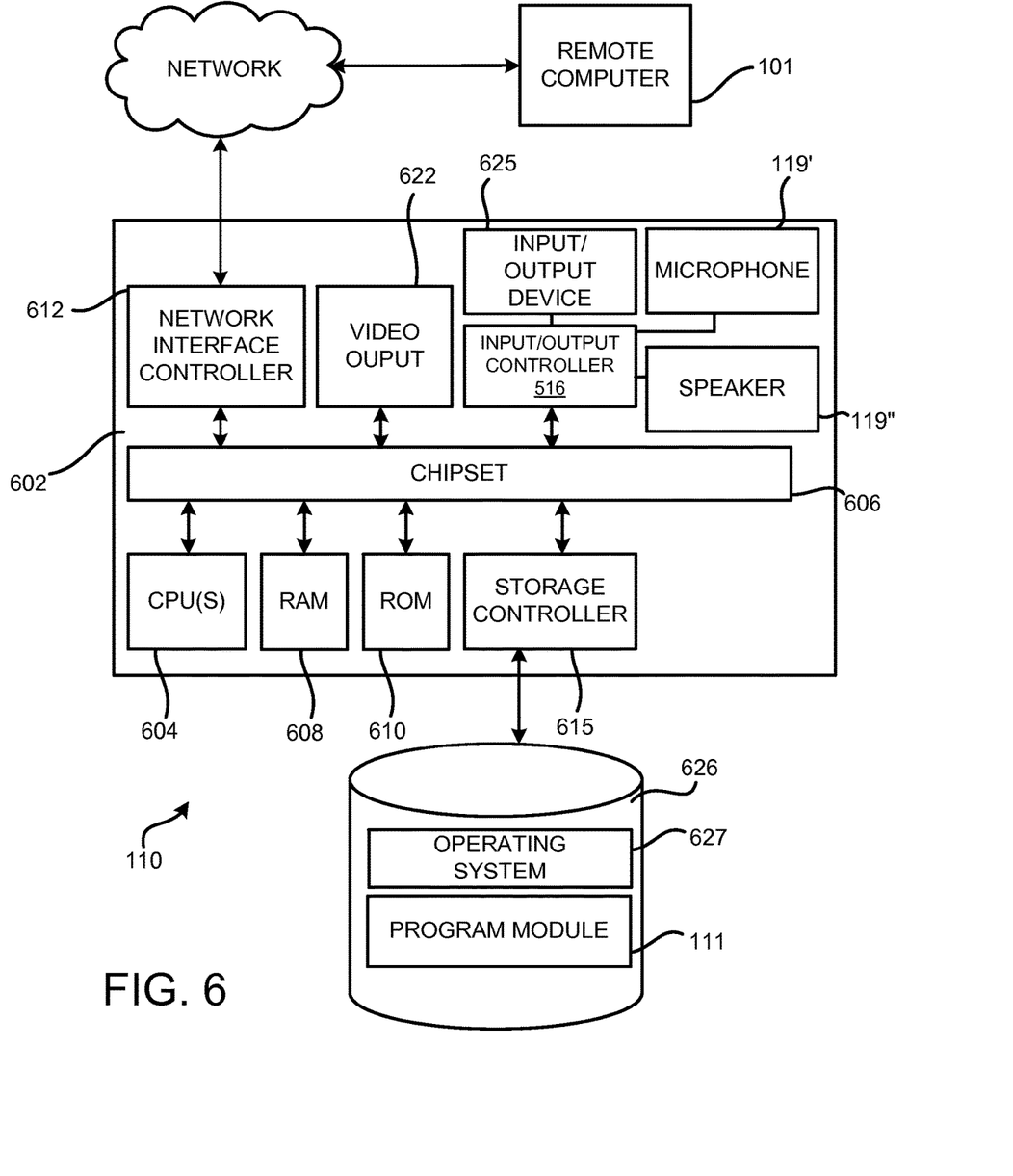
FIG. 6 is a computer architecture diagram showing an illustrative computer hardware and software architecture for a computing device capable of implementing aspects of the configurations presented herein.

FIG. 6 shows additional details of an example computer architecture for the components shown in FIG. 1 capable of executing the program components described above for sharing encrypted data with enhanced security. The computer architecture shown in FIG. 6 illustrates a game console, conventional server computer, workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 6 may be utilized to execute any of the software components described above. Although some of the components described herein are specific to the computing device 110, it can be appreciated that such components, and other components may be part of the remote computer 101.

The computing device 110 includes a baseboard 602, or "motherboard," which is a printed circuit board to which a multitude of components or devices may be connected by way of a system bus or other electrical communication paths. In one illustrative embodiment, one or more central processing units ("CPUs") 604 operate in conjunction with a chipset 606. The CPUs 604 may be standard programmable processors that perform arithmetic and logical operations necessary for the operation of the computing device 110.

The CPUs 604 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a RAM 608, used as the main memory in the computing device 110. The chipset 606 may further provide an interface to a computer-readable storage medium such as a read-only memory ("ROM") 610 or non-volatile RAM ("NVRAM") for storing basic routines that help to startup the computing device 110 and to transfer information between the various components and devices. The ROM 610 or NVRAM may also store other software components necessary for the operation of the computing device 110 in accordance with the embodiments described herein.

The computing device 110 may operate in a networked environment using logical connections to remote computing devices and computer systems through a network, such as the local area network. The chipset 606 may include functionality for providing network connectivity through a network interface controller (NIC) 612, such as a gigabit Ethernet adapter. The NIC 612 is capable of connecting the computing device 110 to other computing devices over the network. It should be appreciated that multiple NICs 612 may be present in the computing device 110, connecting the computer to other types of networks and remote computer systems. The network allows the computing device 110 to communicate with remote services and servers, such as the remote computer 101. As can be appreciated, the remote computer 101 may host a number of services such as the XBOX LIVE gaming service provided by MICROSOFT CORPORATION of Redmond Wash. In addition, as described above, the remote computer 101 may mirror and reflect data stored on the computing device 110 and host services that may provide data or processing for the techniques described herein.

The computing device 110 may be connected to a mass storage device 626 that provides non-volatile storage for the computing device. The mass storage device 626 may store system programs, application programs, other program modules, and data, which have been described in greater detail herein. The mass storage device 626 may be connected to the computing device 110 through a storage controller 615 connected to the chipset 606. The mass storage device 626 may consist of one or more physical storage units. The storage controller 615 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 626, other storage media and the storage controller 615 may include MultiMediaCard (MMC) components, eMMC components, Secure Digital (SD) components, PCI Express components, or the like.

The computing device 110 may store data on the mass storage device 626 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 626 is characterized as primary or secondary storage, and the like.

For example, the computing device 110 may store information to the mass storage device 626 by issuing instructions through the storage controller 615 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 110 may further read information from the mass storage device 626 by detecting the physical states or characteristics of one or more particular locations within the physical storage units.

In addition to the mass storage device 626 described above, the computing device 110 may have access to other computer-readable media to store and retrieve information, such as program modules, data structures, or other data. Thus, although the program module 111, other data and other modules are depicted as data and software stored in the mass storage device 626, it should be appreciated that these components and/or other modules may be stored, at least in part, in other computer-readable storage media of the computing device 110. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computing device 110.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 110. For purposes of the claims, the phrase "computer storage medium," and variations thereof, does not include waves or signals per se and/or communication media.

The mass storage device 626 may store an operating system 627 utilized to control the operation of the computing device 110. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 626 may store other system or application programs and data utilized by the computing device 110, such as the program module 111, file data 113, a key 115, a password 116 and an encrypted file 114, and/or any of the other software components and data described above. The mass storage device 626 might also store other programs and data not specifically identified herein.

In one embodiment, the mass storage device 626 or other computer-readable storage media is encoded with computer-executable instructions which, when loaded into the computing device 110, transform the computer from a general-purpose computing system into a special-purpose computer capable of implementing the embodiments described herein. These computer-executable instructions transform the computing device 110 by specifying how the CPUs 604 transition between states, as described above. According to one embodiment, the computing device 110 has access to computer-readable storage media storing computer-executable instructions which, when executed by the computing device 110, perform the various routines described above with regard to FIG. 5 and the other figures. The computing device 110 might also include computer-readable storage media for performing any of the other computer-implemented operations described herein.

The computing device 110 may also include one or more input/output controllers 616 for receiving and processing input from a number of input devices, such as a keyboard, a mouse, a microphone, a headset, a touchpad, a touch screen, an electronic stylus, or any other type of input device. Also shown, the input/output controllers 616 is in communication with an input/output device 625. The input/output controller 616 may provide output to a display, such as a computer monitor, a flat-panel display, a digital projector, a printer, a plotter, or other type of output device. The input/output controller 616 may provide input communication with other devices such as a microphone 119', a speaker 119", game controllers and/or audio devices. In addition, or alternatively, a video output 622 may be in communication with the chipset 606 and operate independent of the input/output controllers 616. It will be appreciated that the computing device 110 may not include all of the components shown in FIG. 6, may include other components that are not explicitly shown in FIG. 6, or may utilize an architecture completely different than that shown in FIG. 6.

The disclosure presented herein may be considered in view of the following clauses.

Clause 1: An example, comprising: generating an encryption key based on a password; encrypting data, at a first computing device, using the encryption key to generate encrypted data; communicating the encrypted data from the first computing device to a second computing device; and communicating the encryption key from the first computing device to the second computer, wherein the encryption key is configured to enable generation of the data from the encrypted data.

Clause 2: The example of clause 1, further comprising decrypting the encrypted data, at the second computing device, using the encryption key.

Clause 3: The example of clauses 1-2, further comprising removing metadata from the encrypted data.

Clause 4: The example of clauses 1-3, further comprising removing metadata from the encrypted data, wherein at least a part of the metadata includes salt and describes one or more encryption algorithms.

Clause 5: The example of clauses 1-4, further comprising removing metadata from the encrypted data, wherein at least a part of the metadata describes one or more hash algorithms.

Clause 6: The example of clauses 1-5, further comprising removing PBKD-specific metadata from the encryption key.

Clause 7: The example of clauses 1-6, further comprising: removing a first set of metadata from the encrypted data, wherein at least a part of the first set of metadata describes one or more encryption algorithms; and removing a second set of metadata from the encryption key.

Clause 8: A computing device, comprising: a processor; a memory having computer-executable instructions stored thereupon which, when executed by a computing device, cause the computing device to generate an encryption key based on a password; encrypt data using the encryption key to generate encrypted data; cause a communication of the encrypted data from the computing device to a second computer; and cause a communication of the encryption key from the computing device to the second computer, wherein the encryption key is configured to enable generation of the data from the encrypted data.

Clause 9: The computer of clause 8, wherein the memory has further computer-executable instructions, which cause the second computer or another computing device to decrypt the encrypted data using the encryption key.

Clause 10: The computer of clauses 8-9, wherein the memory has further computer-executable instructions, which cause the computing device to remove metadata from the encrypted data, wherein the metadata includes salt data.

Clause 11: The computer of clauses 8-10, wherein the memory has further computer-executable instructions, which cause the computing device to remove metadata from the encrypted data, wherein at least a part of the metadata describes one or more encryption algorithms.

Clause 12: The computer of clauses 8-11, wherein the memory has further computer-executable instructions, which cause the computing device to remove metadata from the encrypted data, wherein at least a part of the metadata describes one or more hash algorithms.

Clause 13: The computer of clauses 8-12, wherein the memory has further computer-executable instructions, which cause the computing device to remove PBKD-specific metadata from the encryption key.

Clause 14: The computer of clauses 8-13, wherein the memory has further computer-executable instructions, which cause the computing device to remove a first set of metadata from the encrypted data, wherein at least a part of the first set of metadata describes one or more encryption algorithms; and remove a second set of metadata from the encryption key.

Clause 15: A computer-readable storage medium having computer-executable instructions stored thereupon which, when executed by a computing device, cause the computing device to: generate an encryption key based on a password; encrypt data using the encryption key to generate encrypted data; cause a communication of the encrypted data from the computing device to a second computer; and cause a communication of the encryption key from the computing device to the second computer, wherein the encryption key is configured to enable generation of the data from the encrypted data.

Clause 16: The computer-readable storage medium of clause 15, wherein the computer storage medium has further computer-executable instructions, which cause the computing device to remove metadata from the encrypted data.

Clause 17: The computer-readable storage medium of clauses 15-16, wherein the computer storage medium has further computer-executable instructions, which cause the computing device to remove metadata from the encrypted data, wherein at least a part of the metadata describes one or more encryption algorithms.

Clause 18: The computer-readable storage medium of clauses 15-17, wherein the computer storage medium has further computer-executable instructions, which cause the computing device to remove PBKD-specific metadata from the encryption key.

Clause 19: The computer-readable storage medium of clauses 15-18, wherein the computer storage medium has further computer-executable instructions, which cause the computing device to: remove metadata from the encrypted data, and remove PBKD-specific metadata from the key.

Clause 20: The computer-readable storage medium of clauses 15-19, wherein the computer storage medium has further computer-executable instructions, which cause the computing device to remove a set of metadata from the encrypted data, wherein at least a part of the set of metadata describes at least one encryption algorithm or at least one hash algorithm.

Based on the foregoing, it should be appreciated that technologies for sharing encrypted data with enhanced security are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method performed by a first computing device, comprising:
   generating an encryption key based on a password associated with a document;
   encrypting, using the encryption key, data of the document;
   generating an output file that includes the encrypted data and unencrypted metadata that describes information configured to encrypt the data and to generate the password;
   removing at least part of the unencrypted metadata from the output file to produce a modified output file; and
   communicating the modified output file and the encryption key from the first computing device to a second computing device.

2. The method of claim 1, wherein the encryption key is configured to enable generation of the data of the document.

3. The method of claim 1, wherein the at least part of the unencrypted metadata includes salt and describes one or more encryption algorithms.

4. The method of claim 1, wherein the at least part of the unencrypted metadata describes one or more hash algorithms.

5. The method of claim 1, further comprising removing password-based key derivation (PBKD) specific metadata from the encryption key.

6. The method of claim 1, wherein the communicating the modified output file and the encryption key from the first computing device to the second computing device is implemented without communicating the password.

7. The method of claim 1, wherein the unencrypted metadata comprises filler data.

8. A computing device, comprising:
a processor; and
a memory having computer-executable instructions stored thereupon which, when executed by the processor, cause the computing device to:
generate an encryption key based on a password;
encrypt data using the encryption key;
generate a file that includes the encrypted data and unencrypted metadata that describes information configured to encrypt the data and to generate the password;
remove at least part of the unencrypted metadata from the file to produce a modified file; and
cause the modified file and the encryption key to be communicated from the computing device to another computing device.

9. The computing device of claim 8, wherein the at least part of the unencrypted metadata includes salt data.

10. The computing device of claim 8, wherein the at least part of the unencrypted metadata describes one or more encryption algorithms.

11. The computing device of claim 8, wherein the at least part of the unencrypted metadata describes one or more hash algorithms.

12. The computing device of claim 8, wherein the memory has further computer-executable instructions, which cause the computing device to remove password-based key derivation (PBKD) specific metadata from the encryption key.

13. The computing device of claim 8, wherein the causing the modified file and the encryption key to be communicated from the computing device to the other computing device is implemented without communicating the password.

14. The computing device of claim 8, wherein the unencrypted metadata comprises filler data.

15. A computer-readable storage medium having computer-executable instructions stored thereupon which, when executed by a computing device, cause the computing device to:
generate an encryption key based on a password;
encrypt data using the encryption key;
generate a file that includes the encrypted data and unencrypted metadata that describes information configured to encrypt the data and to generate the password;
remove at least part of the unencrypted metadata from the file to produce a modified file; and
cause the modified file and the encryption key to be communicated from the computing device to another computing device.

16. The computer-readable storage medium of claim 15, wherein the at least part of the unencrypted metadata describes one or more encryption algorithms.

17. The computer-readable storage medium of claim 15, wherein the causing the modified file and the encryption key to be communicated from the computing device to the other computing device is implemented without communicating the password.

18. The computer-readable storage medium of claim 15, wherein the at least part of the unencrypted metadata describes at least one hash algorithm.

19. The computer-readable storage medium of claim 15, wherein the unencrypted metadata comprises filler data.

* * * * *